May 23, 1950 P. O. SACKSTEDER 2,508,542
WEEDING ATTACHMENT FOR GARDEN HOES
Filed Feb. 15, 1949 2 Sheets-Sheet 1
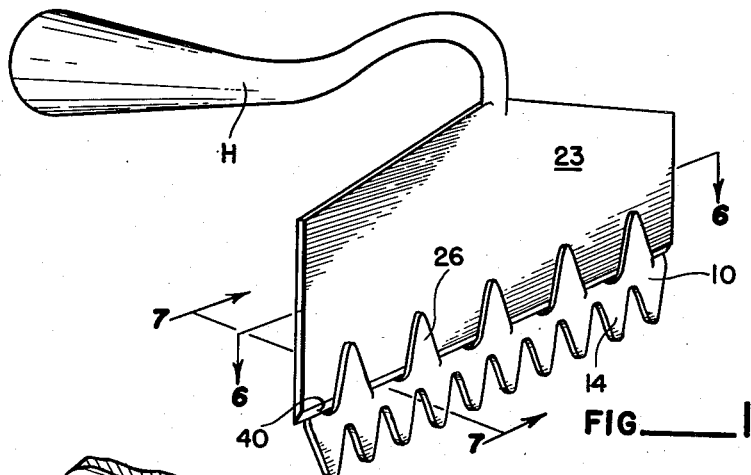
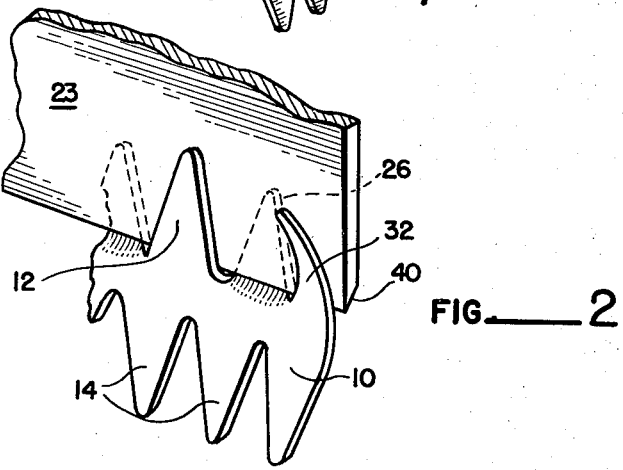
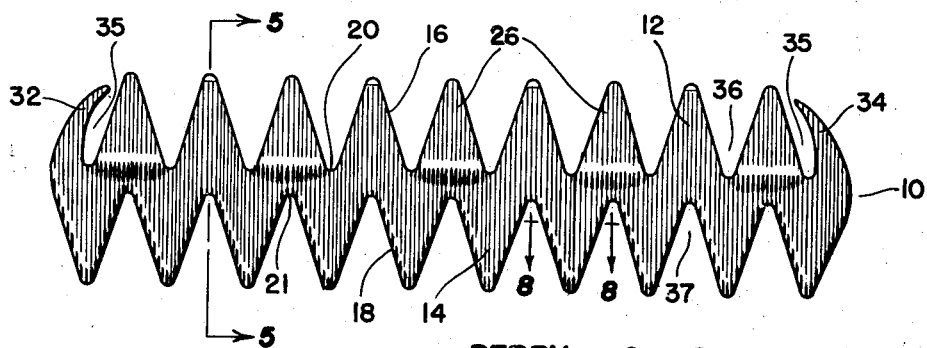
PERRY O. SACKSTEDER
Inventor
By Smith & Tuck
Attorneys May 23, 1950     P. O. SACKSTEDER     2,508,542
WEEDING ATTACHMENT FOR GARDEN HOES
Filed Feb. 15, 1949     2 Sheets-Sheet 2

PERRY O. SACKSTEDER
Inventor

By Smith & Tuck
Attorneys

Patented May 23, 1950

2,508,542

UNITED STATES PATENT OFFICE 2,508,542

WEEDING ATTACHMENT FOR GARDEN HOES

Perry O. Sacksteder, Seattle, Wash.

Application February 15, 1949, Serial No. 76,630

2 Claims. (Cl. 97—65)

My present invention relates to the general art of garden tools, and more particularly to a weeding attachment for garden hoes. My attachment consists of a normally stamped metal unit, having a plurality of opposed teeth, one set of which teeth are disposed in alternately somewhat staggered relationship, so that they form a gripping element, which, together with a curvature formed in the longitudinal axis of the device, provides a very sure gripping arrangement which will hold my device securely to the blade of the ordinary garden hoe.

Persons who tend gardens, and especially those who tend them as home owners, on a semi-amateur basis, usually are ever on the alert for garden tools that seemingly will serve their ever-changing needs, and as a result, quite often the ordinary home owner finds himself possessed with so many garden implements that they become burdensome in use and storage for the same becomes a problem. It is to overcome this condition that I have provided my hoe attachment.

The ordinary garden hoe is practically an indispensable tool for tending gardens and it is probably the most universally adaptable tool. However, there are many times when it does not serve. One condition is where the ground may be packed quite hard, so that the wide edge of the blade of the ordinary hoe cannot be forced into the ground by any normal weight of strokes such as a person can maintain for any reasonable length of time. Under such conditions, my attachment provides an engaging surface that is only a fraction of that provided in the garden hoe, and then, as the lessened hardness of the ground permits deeper penetration, the cutting surface gradually increases until the full width of the hoe is available. Another condition under which my attachment has proved to be very helpful, is that of light weeding, where the weeds are attacked while they are still small. With my present attachment, as distinct from the usual hoe, the weeds can be more pulled out by roots, as though they were being raked up. An ordinary rake, however, does not achieve this purpose and I have found that by having a plurality of teeth, in which the adjacent triangular points come up to a meeting point just under the edge of the hoe proper, that an ideal instrument is provided for loosening the top soil and pulling the weeds out by roots and then collecting the weeds just pulled out, without accumulating a lot of the top soil, which is almost impossible to avoid with a conventional hoe.

The principal object of my present invention, therefore, is to provide a quickly attachable and detachable device, which can be secured to a conventional garden hoe and make it more readily adaptable to a variety of useful operations.

A further object of my invention is to provide an article of manufacture that can be struck out, with dies, from a sheet of steel of high quality material, without any wasting of material.

A further object of my invention is to provide an attachment for a garden hoe, which in effect creates a number of toothed elements of triangular form, so that the combined tool can be forced into firm or packed ground and the depth of the penetration is merely a function of the force applied and the firmness of the ground, as the cutting surface in effect changes from a plurality of points to the full breadth of the hoe blade.

A further object of my invention is to provide an attachment having a plurality of oppositely disposed teeth which can be pointed to give a V entrance and which are so bent on the upper row, that they will form a secure clamp arrangement.

A further object of my invention is to provide a slipon attachment which will provide a secure engagement with the blades of a garden hoe, without the necessity of resorting to cumbersome clamps, bolts or pins to secure the same in place.

Further objects, advantages and capabilities will be apparent from the description and disclosure in the drawings, or may be comprehended or are inherent in the device.

Figure 1 is a perspective view of the head of a garden hoe, showing my attachment secured in operative position on the same.

Figure 2 is a perspective view on an enlarged scale showing one end of my device and a hoe blade, fragmentarily illustrated.

Figure 3 is a face view of my attachment.

Figure 7:
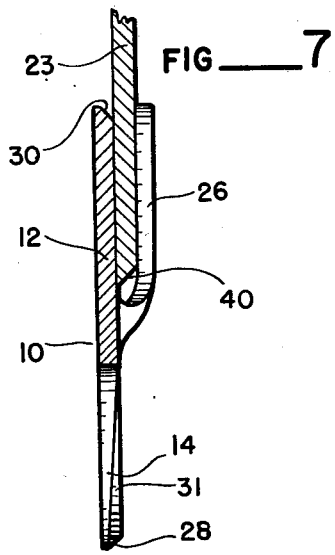
Figure 7 is a vertical sectional view, taken along the plane embracing the line 7—7 of Figure 1.

Referring more particularly to the disclosure in the drawings, the numeral 10 generally designates my device or attachment. This I prefer to form out of alloy sheet steel stock, with symmetrically arranged, oppositely spaced teeth, as 12 and 14. The teeth are arranged with the upper teeth in staggered relationship to the lower teeth. This provides the maximum strength in the unit, with the minimum of material, in that, there is substantially a uniform thickness of metal due to the fact that the sides, for instance, as 16 and 18, of opposite teeth, are parallel but spaced apart from each other, so that the apex of the cut-out portions, as 20 and 21, terminate at what is substantially the base of the triangles formed by the teeth in the opposite side. This relationship is probably best illustrated in Figure 3.

Figure 4:
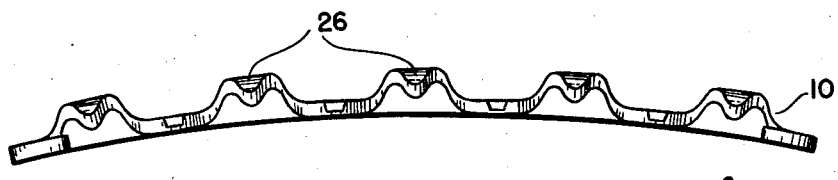
Figure 4 is a top plan view of a portion of my device to illustrate the curve formed in the longitudinal axis of the device.

The lower row of teeth 14 is disposed substantially in a single plane. This plane, however, is only flat when the device is in place upon the blade of the hoe, as 23. This relationship is shown in Figure 6. Normally when the device is made however, it has been found desirable to have it curved, after the showing of Figure 4, along its longitudinal axis. This provides for more secure gripping of blade 23. The upper row of teeth are alternately offset, as probably best illustrated in Figure 5. An offset is provided at 25 and the upper portion of the teeth, as 26, are angularly disposed to lean in towards the plane of the alternate teeth of the upper row, which are in the same plane as the body of attachment 10 and particularly the lower teeth 14. The teeth as formed are preferably beveled as at 28, so as to provide an easier entrance into the ground for teeth 14, and similarly beveled at 30, so as to more easily guide the hoe blade 23 into position when the device is applied to the blade.

It will be noted, particularly in Figures 2 and 3, that the end teeth of the upper row, as 32 and 34, are given a narrower shape in forming, and are then bent inwardly at their points toward the center of the device. This provides a very narrow opening in each case, as 35, which is distinct from the triangular openings as 36 and 37. This provides a greater pinching effect at the extreme end of the attachment, so as to hold the same very securely in position and also provides that the tip of teeth 32 and 34, lie well within the margins of the hoe blade 23, so that they will not catch on plants or pick up debris.

Figure 5:
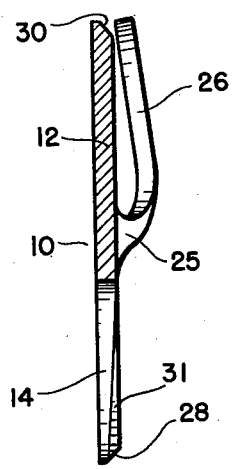
Figure 5 is a cross sectional view, taken along the line 5—5 of Figure 3.
Figure 6:
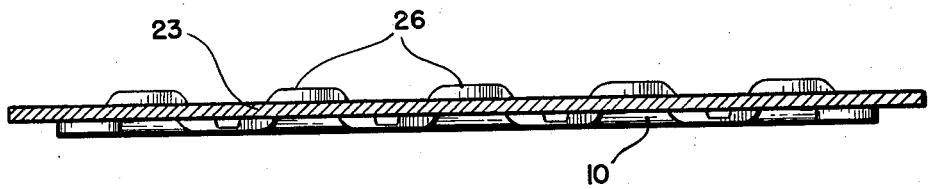
Figure 6 is a cross sectional view taken along the line 6—6 of Figure 1.

When it becomes desirable to use my attachment, the conventional hoe, having normally an elongated wooden handle, is grasped by the blade 23 or the metal shank secured thereto, and the beveled edge 40 of the hoe is entered in between the beveled edges 30 and the inwardly bent tines or points 26, which are normally in the position shown in Figure 5. Then as the blade 23 is pressed down with the tips 28 on some firm object, blade 23 is forced downwardly to substantially the position shown in Figure 7. This invites attention to the desirability of having tines 26 carefully formed in their manufacture, so that when blade 23 is firmly in place, it will be gripped by the teeth 12 throughout their length. When the blade is gripped fully throughout the entire length engaged in the device, it will be found that a very secure frictional locking occurs; and it will be found necessary normally to use a screw driver or some instrument that a prying effort can be applied to, in order to dislodge the attachment. It is to be observed that when the attachment is fully in place, as shown in Figure 1, it is secured by a gripping action over a relatively large area, because of the number of teeth employed; yet when properly made of relatively light stock, the weight of the attachment adds but very little to the overall weight of the hoe. Consequently, it is convenient to use. Experience has demonstrated that instead of the device tending to loosen from the hoe, any chopping action by the user normally tends to seat the blade 23 further down into the seat, as noted in Figure 7; and because of this, it is practical to use the assembled device as a rake, or as a chopping or cutting implement and no longitudinal applied force will dislodge the attachment, even though the same is not secured by the usual clamping means, such as screws, bolts or clamps.

Figure 8:
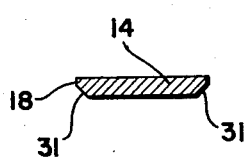
Figure 8 is a cross sectional view taken along the line 8—8 of Figure 3.

It has often been found desirable to sharpen or bend the sides of the lower teeth, especially when deep cultivation is practiced in firm soil. This is illustrated at 31 in Figures 5 and 7 and in the cross-sectional view, Figure 8.

It is believed that it will be clearly apparent from the above description and the disclosure in the drawings that the invention comprehends a novel construction of a weeding attachment for garden hoes.

Having thus disclosed my invention, I claim:

1. An attachment for the cutting edge of a garden hoe, consisting of: a toothed member formed of sheet material having a plurality of downwardly extending, triangularly shaped teeth; a plurality of upwardly extending teeth, disposed in staggered relationship to the said downwardly extending teeth; a plurality of upwardly disposed teeth, alternately spaced from each other and bent at their roots out of the plane of the remaining upper teeth, and having their upper ends disposed toward the plane of the undistorted upwardly directed teeth; and upwardly disposed teeth on each end of said device, having a smaller area than the balance of the teeth of the device and with their upper ends directed toward the minor axis of the device.

2. An attachment for the cutting edge of a garden hoe, consisting of: a toothed member formed of sheet material having a plurality of downwardly extending, triangularly shaped teeth; a plurality of upwardly disposed teeth, disposed in staggered relationship to the said downwardly extending teeth, alternately disposed in two planes, one in the plane of the downwardly extending teeth and the other set bent at their roots out of the plane of the remaining upper teeth, and forming a plane substantially parallel to the general plane of the device; and upwardly disposed teeth on each end of said device, having a smaller area than the balance of the teeth of the device and with their upper ends directed toward the minor axis of the device.

PERRY O. SACKSTEDER.

REFERENCES CITED

The following references are of record in the file of this patent:

UNITED STATES PATENTS

| Number | Name | Date |
|---|---|---|
| 1,174,804 | Bell | Mar. 7, 1916 |
| 2,280,778 | Andersen | Apr. 28, 1942 |

FOREIGN PATENTS

| Number | Country | Date |
|---|---|---|
| 21,828 | Switzerland | Apr. 16, 1942 |